(12) United States Patent
Mauleon et al.

(10) Patent No.: US 6,511,635 B2
(45) Date of Patent: *Jan. 28, 2003

(54) FLUID STATE CATALYTIC CRACKING REACTOR HAVING SOLID FASTENED PACKING ELEMENT FOR HOMOGENEOUSLY DISTRIBUTING PARTICLE FLOW

(75) Inventors: Jean-Louis Mauleon, Ste Croix sur Aizier (FR); Mariano Del Pozo, Le Havre (FR); Daniel Barthod, Honfleur (FR)

(73) Assignee: Total Raffinage Distribution S.A., Puteaux ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,166

(22) Filed: May 24, 1999

(65) Prior Publication Data

US 2002/0112988 A1 Aug. 22, 2002

(30) Foreign Application Priority Data

May 25, 1998 (FR) .................................. 98 06526

(51) Int. Cl.⁷ .............................. B01J 8/18; C10G 11/02
(52) U.S. Cl. .................... 422/145; 422/144; 422/214; 422/215; 208/113; 208/146; 208/153; 208/156
(58) Field of Search .................... 422/143, 144, 422/145, 311, 224, 234, 235, 139, 214, 215, 213, 223; 502/41; 208/163, 158, 146, 113, 153, 156

(56) References Cited

U.S. PATENT DOCUMENTS

| 2,481,439 A | * | 9/1949 | Ogorzaly | .................... 422/144 |
| 3,353,925 A | | 11/1967 | Baumann et al. | |
| 3,664,638 A | * | 5/1972 | Grout et al. | .................... 366/338 |
| 4,179,222 A | * | 12/1979 | Strom et al. | .................... 336/337 |
| 4,514,285 A | * | 4/1985 | Niccum et al. | .................... 208/148 |
| 4,786,368 A | * | 11/1988 | York et al. | .................... 202/99 |
| 5,063,000 A | * | 11/1991 | Mix | .................... 261/94 |
| RE34,255 E | * | 5/1993 | Friedrich | .................... 366/337 |
| 5,320,428 A | * | 6/1994 | Streiff | .................... 366/337 |
| 6,146,519 A | * | 11/2000 | Kove | .................... 208/146 |

FOREIGN PATENT DOCUMENTS

| EP | 191 695 | 8/1986 |
| EP | 209 442 | 1/1987 |
| EP | 458 416 | 11/1991 |
| EP | 719 850 | 7/1996 |
| FR | 2 654 435 | 5/1991 |
| FR | 2 753 453 | 3/1998 |

* cited by examiner

Primary Examiner—Hien Tran
(74) Attorney, Agent, or Firm—Sughrue Mion, PLLC

(57) ABSTRACT

The upstream portion of a reactor (1), contains, between the feeding area of the catalyst flow and the injection area of the charge to be cracked, at least one solid and attached packing element (6, 6'), that extends over all or part of the cross section of the reactor and consists of a network of cells through which pass the catalyst particles. This network makes it possible to create at least one step of division and recombination of the flow of catalyst particles, so as to redistribute the latter in a homogenous manner over the cross section of the reactor.

12 Claims, 4 Drawing Sheets

FLUID STATE CATALYTIC CRACKING REACTOR HAVING SOLID FASTENED PACKING ELEMENT FOR HOMOGENEOUSLY DISTRIBUTING PARTICLE FLOW

BACKGROUND OF THE INVENTION

This invention relates to the catalytic cracking of hydrocarbons in the presence of a fluidized phase catalyst. More particularly its objectives are a method and device that make it possible to introduce a homogenous flow of catalyst grains in the reaction section, at the injection level of the charge to be cracked.

As known, the oil industry uses heavy hydrocarbon charge conversion methods in which hydrocarbon molecules with a high molecular weight and high boiling point are split into smaller molecules that can boil in lower temperature ranges that befit the sought use.

In this field, the method most used is currently the method called fluid catalytic cracking (or FCC method). In this type of method, the hydrocarbon charge, pulverized into fine droplets, is put in contact with high temperature cracking catalyst grains that circulate in the reactor in the form of a fluidized bed, meaning in a more or less heavy medium within a gaseous fluid that ensures or helps their transport. On contact with the hot catalyst, the charge vaporizes, this is followed by the cracking of the hydrocarbon molecules on the active sites of the catalyst. Once the desired molecular weight range has been reached in this manner, accompanied by a depression of the corresponding boiling points, the effluents of the reaction are separated from the catalyst grains. These catalyst grains, deactivated as a result of the coke that has deposited on their surface, are then stripped in order to recuperate the hydrocarbons that have been swept away, then are regenerated by combustion of the coke, and lastly, are put back in contact with the charge to be cracked.

The reactors used are generally vertical reactors of the tubular type, in which the catalyst moves following a flow that is mostly upward (the reactor is then called "riser") or following a flow that is mostly downward (the reactor is then called "dropper" or "downer").

We know that one of the key factors of the catalytic cracking process lies in the quality of the mixture of the charge that is injected in liquid state in the form of fine droplets, with the flow of hot catalyst grains resulting from the regeneration. Indeed, it is essential to ensure that the hydrocarbons are quickly, closely and evenly put in contact with the catalyst flow, as this determines the efficiency of the thermal transfer from the hot catalyst grains to the droplets of the charge. The speed and evenness of the vaporization of the charge depend on the efficiency of this transfer, and therefore, so does the quality of the conversion of the charge since the catalytic cracking reaction takes place in the gaseous state.

However, the studies completed in this field by the applicant have revealed that the yields obtained with the highest performing cracking units remain below what was predicted by the theoretical studies and that this difference is due among other things to the fact that the droplets of charge were not put in contact with the catalyst particles in an adequate fashion. We assumed that it was in part due to an inhomogeneity of the density of the fluidized bed of the catalyst that arrives in the injection area of the charge, or in other words to a signification segregation within the mixture consisting of the catalyst grains and the gaseous fluid that ensures their transportation.

In particular, we have illustrated two main factors of segregation:

On the one hand, in conventional devices, the circulation pattern of the catalyst grains often lacks stability. In particular, the catalyst grains emanating from the regenerator tend to show up "in bunches" and a phenomenon called pulsation phenomenon is then noticed: the feeding of catalyst grains into the reactor is not continuous, and the density of the catalyst flow arriving in the cracking zone may then fluctuate considerably in time around an average value. This pulsating pattern shows a fluctuation in time of the actual C/O ratio of the quantity of catalyst C introduced in the reaction zone to quantity O of the injected charge to be cracked.

On the other hand, in particular for units equipped with a upward flow reactor (riser), in the slanted conduit that ensures the transfer of the regenerator's catalyst grains toward the reactor, these grains tend to gather on the bottom, while the conveyor vapor creates "pockets" in the upper part of this transfer conduit. The elbow that is present at the point of connection between this slanted conduit and the reactor only accentuates the segregation. As the catalyst's fluidization device that is present at the entry of the reactor does not allow for the re-balancing of the distribution of catalyst grains on the section of the reactor, we notice, for one same section, an inhomogeneity of the density of the catalyst. The results in an inhomogeneity of the actual C/O ratio and therefore of the temperature profile for one same section of the reactor.

At the injection area of the charge, these spatial and temporal variations of the actual C/O ratio have proved to be particularly problematic, since they lead to an inhomogeneity of the vaporization and the cracking of the injected charge. In areas where the density of the catalyst is too high, the charge runs the risk of overcracking, which generates dry gases and coke at the expense of the sought intermediate hydrocarbons. In return, in area where the density of the catalyst is insufficient, the charge is only partially vaporized, which leads to an increased deposit of hydrocarbons on the surface of the catalyst, by collision of the catalyst grains with the non vaporized droplets of the charge, from which results a greater coking of the catalyst. In other respects, the deficit in catalytic sites favors the thermal cracking reactions, which are not very selective, at the expense of the catalytic cracking reactions.

In the end, all these phenomena translate into a significant penalty in terms of conversion yields and selectivity, and lead to a significant coking of the separation and stripping chamber and inside the reactor In order to remedy the problems described above, the applicant has already proposed a certain number of solutions.

In patent EP-0 326 478, we proposed a new form for the connection that ties the regenerator to the reactor of a catalytic cracking unit that operates in the upward mode. In particular, this connection consists of tubing connected by incurved elbows that dictate neither an upturning point on the particles' path, nor sudden modifications of the tubing diameter. Injections of a make up carrier gas are also planned in order to accelerate the catalyst particles in a controlled manner at the level of the reactor's connection elbow. By using this process we can connect the catalyst transfer line and the upward reactor following a curvilinear profile, which makes it possible to limit the dehomogenization of the catalyst and of the fluid that ensures its transport, but it does not however, make it possible to completely eliminate the inevitable segregation that takes place in a solid/gas biphasic mixture, nor the pulsating pattern of the circulation of the catalyst. Furthermore, it corresponds to an optimization of the configuration of a unit that contains a reactor that operates in an upward mode, and therefore in no way affects the unit where the reactor operates in a downward mode.

In patent EP-0 191 695, the applicant has described an advantageous fluidization system in two steps at the base of an upward reactor. The proposed solution consists in slowly injecting a first fluid into the reactor, below the level of introduction of the catalyst grains emanating from the regeneration area, in order to maintain a dense and homogenous catalyst fluidized bed at the bottom of the "riser", and in simultaneously injecting a second fluid below the upper part of the dense catalyst bed, in order to obtain a more diluted and homogenous fluidized phase with a constant flow of catalyst grains, upstream from the injection area of the charge. Such a procedure, although efficient, does nevertheless present considerable inconveniences. It consumes large amounts of fluidization vapor and often results in an excessive dilution of the suspension of catalyst grains, which can be harmful to the vaporization speed of the charge to be cracked and therefore to the conversion of the latter. Furthermore, once again, the procedure was specifically intended to answer the fluidization problems encountered in an upward flow reactor ("riser") and can in no way be transposed to cases using downward flow reactors ("downers").

SUMMARY OF THE INVENTION

This invention proposes to remedy these inconveniences using a device that makes it possible to introduce a homogenous and stable flow of catalyst particles in the injection area of the charge to be cracked, whether this reactor is an upward or downward reactor.

Consequently, the object of the invention is a device for introducing fluid state catalyst particles in a catalytic cracking reactor equipped, in its upstream part, with at least one means of feeding catalyst particles that are at least partially regenerated, and at least one means of injecting the charge to be cracked, where this device is characterized by the fact that said upstream part of the reactor contains, between the feeding area of the catalyst flow and the injection area of the charge to be cracked, at least one solid and attached packing element that extends over all or part of the reactor's cross section and that consists of a network of cells through which pass the catalyst particles, where said network ensures at least one step in the dividing and recombining of the flow of catalyst particles, so as to redistribute the latter in a homogenous manner on the cross section of the reactor.

In this description, by network of cells, we mean a set of at least two cells and, preferably, of a large number of cells, disposed side by side and that may or may not be identical in size.

Furthermore, by reactor we mean the tubular type vertical chamber in which the charge to be cracked is put in contact with a flow of catalyst particles that move following a flow that is essentially upward ("riser" type reactor) or following a flow that is essentially downward ("dropper" or "downer" type reactor).

In the invention's device, the reactor contains one or several solid and attached packing elements, meaning they do not contain any mobile parts. Preferably, each packing element extends over the entire cross section of the reactor.

Such a packing element can advantageously consist in a grid. The element then ensures a division followed by a recombination of the flow of gas and particles that passes through it.

It can also consist of a system of intersecting and stacked bars possibly soldered to each other. The bars that are used may have any type of section; advantageously they will have a rounded section, in order not to present any sharp angles that would result in abrasions caused by the flow of catalyst particles.

The preferred packing elements are elements of the static mixer type. Indeed, such an element by itself and over a very short distance ensures an entire series of successive divisions/recombinations of the flow of gas and particles that passes through it.

A first advantage of the invention's device as compared to that of the prior art is that it makes it possible to avoid having to introduce too much fluidization vapor, as in patent EP-0 191 695, which not only reduces the operational constraints of the unit but also proves to be very beneficial in terms of operational costs of this unit. Furthermore, it also makes it possible to avoid the risk of an excessive dilution of the flow of catalytic particles, which can be harmful to the efficiency of the vaporization of the charge. Last but not least, it ensures, in a minimum of space, an optimal stirring of the catalyst's fluidized bed.

A second advantage of said device concerns its universal character: it can indeed be applied to any type of reactor, whether it be a "riser" or "downer" type reactor, without the need for any substantial modifications to the latter since all that must be done is to insert said packing. Easy to implement and fairly low in cost, the invention's device is therefore extremely advantageous in the frame of the modernization of existing units.

Another objective of the invention concerns the procedure associated with the above-mentioned device. In this procedure of catalytic cracking of a hydrocarbonaceous charge, we feed a tubular type reactor, whose flow is an essentially upward or downward, with catalyst particles that are at least partially regenerated, in the form of a fluidized bed into which we then inject the charge to be cracked. This procedure is characterized by the fact that, between the feeding of the catalyst flow and the injection of the charge to be cracked, we have provided for at least one step consisting in one or several simultaneous divisions of the flow of catalyst grains followed by a recombination of said flow, so as to redistribute the latter in a homogenous manner over the cross section of the reactor.

The method and device as set forth in the invention make it possible to reach the afore-mentioned objectives. Indeed, they make it possible to obtain one, and preferably several successive stages of division and recombination of the flow of catalyst grains, which results in radially mixing and homogenizing the catalyst flow that penetrates the injection area of the charge over the entire section of the reactor.

Furthermore, and surprisingly so, the invention has proved to have a stabilizing effect on the feeding of the reactor in catalyst particles. Indeed, we note a disappearance of the rapid pulses of the catalyst flow that penetrates the injection area of the charge. This continuity of the feeding in catalyst is fundamental, more so when, as is often the case, we seek to reduce the duration of contact between the charge and the catalyst.

The homogenization and stabilization of the feeding of the reactor with catalyst flow result in a better homogeneity of the actual C/O ratio in the injection area of the charge, which leads to an improvement of the quality of thermal transfers between the droplets of charge and a more homogenous and continuous catalyst flow. The velocity and uniformity of the vaporization of the charge are therefore improved and thus we note a reduction in the local phenomena of overcracking and insufficient vaporization. So, we not only increase the rate of conversion of the charge but also the selectivity of this conversion: fewer lighter products (such as dry gases that are not very amenable to beneficiation) and less coke are created.

This reduction in the quantity of coke that is created when the charge is put in contact with the catalyst is all the more noticeable because it makes it possible, on the one hand, to have a better control of the thermal balance of the unit, and on the other hand, to avoid a premature deactivation of the catalyst through neutralization of the catalytic sites. Furthermore, it makes the catalyst regeneration step easier by reducing the risk of appearance of hot spots that could harm the catalyst, and by reducing the risks of reaching temperature levels in the regenerator(s) that are particularly high and incompatible with the metallurgy of the unit.

Another advantage of the invention is tied to the improvement of the vaporization process of the charge, which makes possible the conversion of very heavy cuts in the catalytic cracking unit, such as for example residue. Indeed, these charges boil at particularly high temperatures and are known for being hard to vaporize under the conditions of the cracking reaction. By proposing a better contact between the droplets of the charge and the grains of the catalyst, the invention allows for a better vaporization of said charge, which makes it possible to convert charges that contain much higher quantities of heavy products. The flexibility and profitability of the catalytic cracking unit are thus increased.

Other advantages of the method and device as set forth in the invention will become apparent in the more detailed description of a few preferred methods of realization.

Preferably, the device as set forth in the invention contains one or several packing elements, so as that a large number of successive divisions and recombinations of the flow of catalyst grains can be attained upstream from the injection area of the charge.

Preferably, the divisions of the flow of catalyst grains must be as fine as possible, while taking into account the requirements tied to the circulation of particles, the constraints of the process and the space available to set up the packing element(s) that ensure said divisions.

Each packing element is positioned on the reactor's cross section, perpendicular to the axis of the latter, and consists of a network of cells that make it possible to obtain, one if not several successive stages of division/recombination of the flow of catalyst particles that passes through said cells. The section of these cells is chosen based on the size and the speed of passage of the catalyst particles, in order to avoid an obstruction inside the packing element, which could hinder the circulation of the catalyst flow.

According to one preferred mode of realization, the packing element consists of a network of cells where each cell guides in a considerably radial manner in relation to the axis of the reactor, the direction of the flow of gas and particles that passes through it. These cells may take on many forms.

In particular, the static mixer type packing elements, usually used in other fields, can be adapted and make particularly efficient elements.

Advantageously, we will use a packing element that consists of a network of cells set up so as to induce deviations in two different types of directions: more or less 50% of the flow of gas and catalyst is diverted in a first direction and more or less 50% of the flow of gas and catalyst is diverted in a second direction that forms a 10 to 90 degree angle with the first direction.

This deviation and this radial orientation are induced by the geometry of said cells, disposed to form a network. Such a network can advantageously consist of an assembly of corrugated sheets, cut crosswise in relation to their planes. These corrugated sheets are molded or soldered in such a way that the ridge of the corrugation of each sheet creates an angle of more or less 45 to 135 degrees with the ridge of the corrugation of the sheet adjacent to it. According to one preferred mode of the invention, this angle is a 90 degree angle, thus defining a network of right angle intersecting canals. By ridge of the corrugation, we mean the right section consisting of the top of a corrugation of the sheet.

This disposition in intersecting canals advantageously makes it possible to divert the particles at each intersection between the tops of the corrugations of a first sheet and the tops of an adjacent sheet, thus improving the divisions and recombinations of the particles and the fluid surrounding them. The packing element that is created in this manner has the advantage of creating by itself an entire series of successive divisions/recombinations, optimized so as to result in a good mixture and a homogenization of the catalyst particles and the gaseous fluid within the fluidized bed.

Static mixers of the type marketed by Sulzer-SMV or Kenics can be adapted in order to create such a packing.

Other types of static mixers can also make excellent packing elements, such as the static mixers consisting of one or several helix fragments. Advantageously, said static mixer consists of several helix fragments side by side and staggered in rotation.

According to a mode of realization particularly advantageous, the catalytic cracking reactor contains at least two, and preferably from two to four packing elements, which can be identical or not.

These packing elements may be side by side or, on the contrary, be spaced at a distance based on their nature and on the geometric constraint of the procedure.

If at least two identical packing elements are present, they will preferably be staggered in translation and/or in rotation, so that the networks of each are not literally on top of each other.

For example, if said elements consist of assembled corrugated sheets, the plane of the corrugated sheets of a first element will preferably be oriented so as to form an angle of more or less 45 to 90 degrees with the plane of the corrugated sheets of the closest second element of the same type.

The packing elements involved in the device as set forth in the invention must remain intact in the severe conditions of implementation of the fluid phase catalytic cracking process. In particular, they consist of one or several materials that are able to resist heat and erosion, such as high temperature steel and ceramic.

Advantageously, the packing elements are positioned, in the vertical part of the reactor located upstream from the injection of the charge, at a level such that the flow of catalyst grains that passes through them is in the form of a fluidized phase, whose density can density can be adjusted to a value ranging between 200 and 800 kg/m$^3$ through injection of fluidization vapor.

These packing elements are positioned upstream from the injection area of the charge: the distance that separates the downstream packing element from the upstream injectors preferably ranges between 0.3 and 3 times the average diameter of the reactor.

A particularly advantageous alternative of the process as set forth in the invention consists in later rehomogenizing the flow of catalyst particles immediately downstream from the injection of the charge to be cracked, by recentering the catalyst particles in the direction of the axis of the reactor. This allows for the correction of the segregation induced by the injection of the charge and the very fast vaporization of the latter, which tend to project and concentrate the catalyst on the walls of the reactor. Thus, we now have a real mixing chamber, that contains means of homogenization of the fluidized bed of the catalyst both upstream and downstream from the injection of the charge, which can make it possible to optimize even more completely, the efficiency of the contact between the catalyst and the hydrocarbons to be cracked.

In order to homogenize the reaction mixture downstream from the injection of the charge, we can use any means known that makes it possible to deviate the path of the catalyst particles and preferably push them back in the direction of the central axis of the reactor.

This can advantageously be done by using one or several profiled circular obstacles, positioned over the entire periphery of the internal wall of the reactor, that ensure there will be one or several local narrowings of the section of the latter. These obstacles can advantageously be annular or helicoidal, with rounded section, for example hyperbolic, in a semi-circle or even in a semi-ellipse. Thus, the absence of sharp angles avoids any risk or erosion of said obstacles by the flow of catalyst particles.

We can also use one or several packing elements such as those used in the homogenization of the fluidized bed of the catalyst upstream from the injection of the charge and that are described previously, such as grids, intersecting bars, and elements of the static mixer type.

We can also have recourse to a recentering gaseous fluid injection device, positioned on or in the internal wall of the reactor and as described in patent EP-0 485 259, in the name of the applicant.

So, in order to strengthen the efficiency of the process as set forth in the invention, we can have recourse to one or several successive means of re-homogenization of the reaction mixture, positioned immediately downstream from the injection of the charge: preferably, these means are located at a distance ranging between 0.5 and 2 times the average diameter of the reactor from the injectors the most downstream.

In this description, the mode of injection used is not specified and can be any mode of injection known in the industry. In particular, the injection of the charge to be cracked can be perfectly executed with the current and/or against the current in the overall direction of the circulation of the catalyst in the cracking reactor (see for example patent EP-0 209 442, in the name of the applicant).

Likewise, the type of catalyst used is not mentioned nor is the means for circulating the latter in the form of a fluidized bed more or less diluted by dilution gaseous fluids which is data well known to a person experienced in the field.

Furthermore, the experienced person will definitely be able to adapt the device and the method that are the objects of this invention to procedures related to catalytic cracking, such as for example, procedures where thermal cracking type reactions are carried out by putting a hydrocarbon cut to be converted in contact with a fluidized phase of heat carrying particles in a tubular type reactor.

Various forms of implementation of the invention will be described in more detail later, while referring to the attached drawings. These are only intended for purposes of illustrating the invention and are therefore not intended as limitative in any way as the device and method that are the objects of this invention may be implemented according to a great many alternatives.

DETAILED DESCRIPTION OF THE PREFERRED EMBODIMENTS

Figure 1:
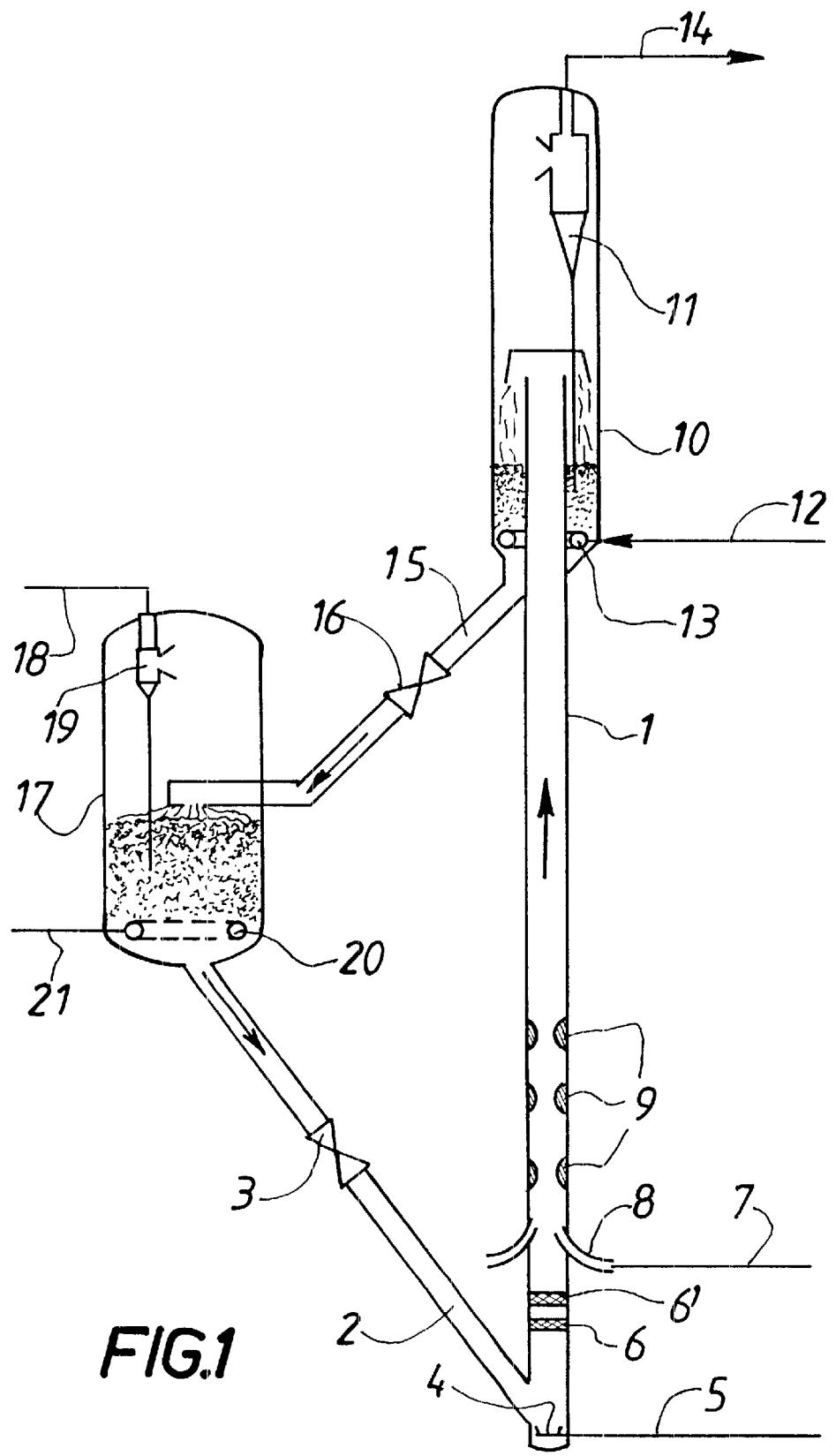
FIG. 1 represents a catalytic cracking unit equipped with a reactor whose flow is essentially upward and within which is integrated a device as set forth in the invention.

FIG. 1 illustrates a form of implementation of the device that introduces the catalytic particles according to the invention, in a catalytic cracking unit equipped with a reactor whose flow is essentially upward. This unit is a type known in the industry. It contains in particular a reactor in the form of column 1, called charge elevator, or riser, fed at its base by line 2 with regenerated catalyst particles in a set quantity. An elevator gas, for example water vapor, is introduced into column 1 through line 5, using a diffuser 4, whereas the charge to be cracked is conveyed using line 7 and injected into the reactor 1 using the injectors 8.

As set forth in the invention, two packing elements 6 and 6', in this case two grids fastened in the reactor 1 across the latter, are located immediately upstream from the injection area of the charge and make it possible to homogenize and stabilize the density of the flow of particles and gas that penetrates into said area.

Furthermore, the reactor 1 can, as an option, contain a series of profiled annular obstacles 9, positioned over the entire periphery of its internal wall, immediately downstream from the injection area, in order to remix the reaction medium. These obstacles may consist of heat resistant material and have a thickness such that they lead to a reduction of 5% to 30% of the reactor's section. Here, three obstacles are represented, but there may be from one to ten and, preferably, they are spaced at a distance ranging between 0.5 and two times the average diameter of the reactor.

Column 1 opens at its top into a chamber 10, which for example, has the same center as the column and in which the separation of the charge to be cracked and the stripping of the deactivated catalyst particles take place. The catalyst is separated from the treated charge in a cyclone 11, that is located in the chamber 10, at the top of which there is a discharge line 14 for the effluents of the reaction, which are conveyed toward a fractionation area that is not represented. The deactivated catalyst particles move by gravity toward the base of chamber 10. A line 12 feeds stripping fluid, usually water vapor, into fluidization gas injectors or diffusers 13 placed at regular intervals at the base of the chamber 10.

The deactivated catalyst particles so stripped are discharged at the base of chamber 10 toward a regenerator 17, via a pipe 15, on which a control valve 16 is provided. In the regenerator 17, the coke deposited on the catalyst particles is burned using air, injected at the base of the regenerator through a line 21 which feeds the evenly spaced injectors or diffusers 20. The catalyst particles carried by the combustion gas are separated by cyclones 19, from whence the combustion gas is discharged via a line 18, whereas the catalyst particles are thrown back toward the base of the regenerator 17, from where they are recycled to feed the elevator 1 via the pipe 2 equipped with a control valve 3.

The dimensional and operational characteristics of a unit of the same type as that represented in FIG. 1 are usually as follows:

height of the reactor-elevator 1:5 to 40 meters, total rate of feed of the elevator 1 in charge(s) to be treated: 2,000 to 15,000 tons per day, rate of feed of the reactor 1 in catalyst: 3 to 50 tons per minute, temperature(s) of the charges to be cracked: 70 to 450° C., cracking temperature in the reactor 1, downstream from the injection area: 500 to 600° C., operational pressure in the reactor $1:0.5.10^5$ to $5.10^5$ relative Pascals, residence time of the charge in the elevator 1:0.1 to 10 seconds, regeneration temperature of the catalyst: 600 to 950° C., residence time of the catalyst in the regenerator 9:5 to 20 minutes.

Figure 2:
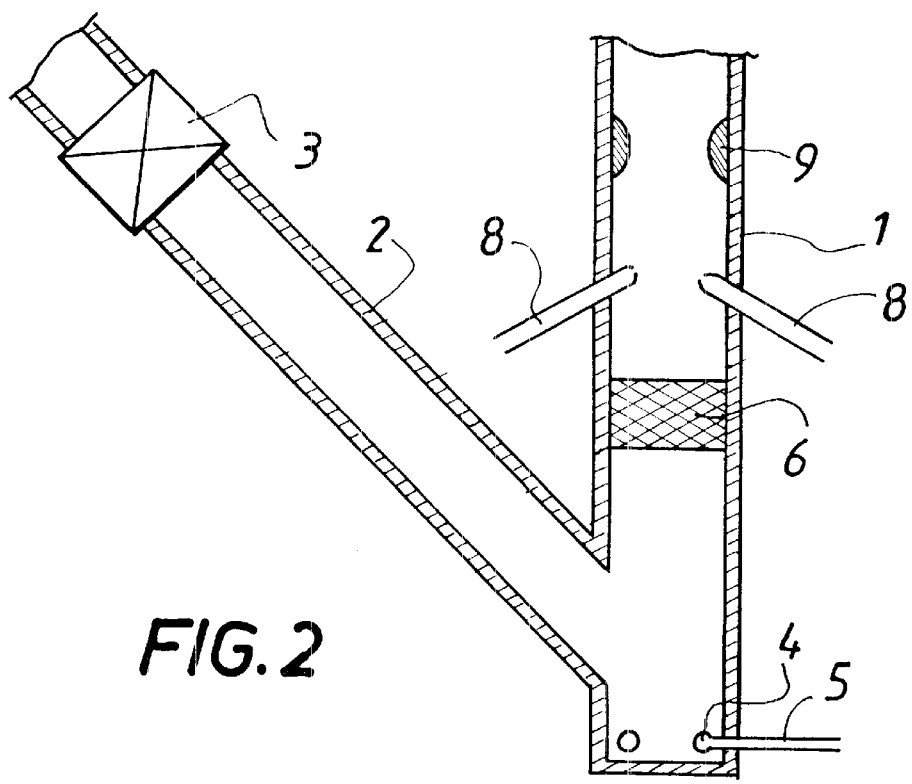
FIGS. 2 and 3 are more detailed views that show two alternatives of realization of the invention in a reactor whose flow is essentially upward.

FIG. 2 is a more detailed view of the upstream part of the reactor 1 of a unit of the type that is described in the preceding figure. A packing element 6 of the static mixer type, and that can very advantageously be the element described in FIG. 4, ensures a homogenization and a stabilization of the flow of gas and of catalyst particles that penetrates into the injection area of the charge to be cracked, located at the level of the charge injectors 8. Immediately downstream from said injection area of the charge, a series of profiled annular obstacles 9 with a rounded section, of which only the first is represented, make it possible to divert the flow of catalyst particles mixed with the charge, and in particular to push said particles back in the direction of the central axis of the reactor 1. The portion of the reactor 1 contained between the static mixer 6 and the first annular obstacle 9 thus forms a real mixing chambre, optimized so as to result in a close and uniform contact between the catalytic particles and the charge to be cracked, pulverized within said chamber using the injectors 8.

Figure 3:
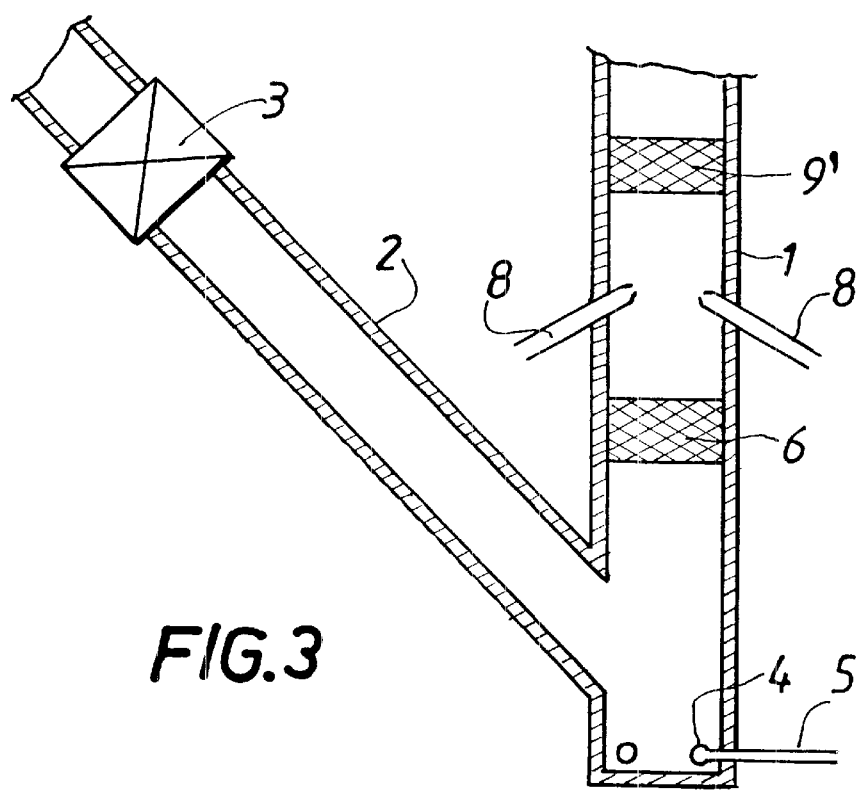

FIG. 3 represents a possible alternative in relation to FIG. 2. As set forth in the invention and as in FIG. 2, a packing element 6 of the static mixer type is positioned in the elevator reactor 1, immediately upstream from the charge injectors 8. Downstream from the latter, a second packing element of the static mixer type 9', that may be identical to or different from element 6, is used as a means of re-centering the catalyst particles immediately after the injection of the charge to be cracked. Therefore, the reactor 1 is provided, between the two elements 6 and 9', with a particularly efficient injection and mixing chamber.

Figure 4:
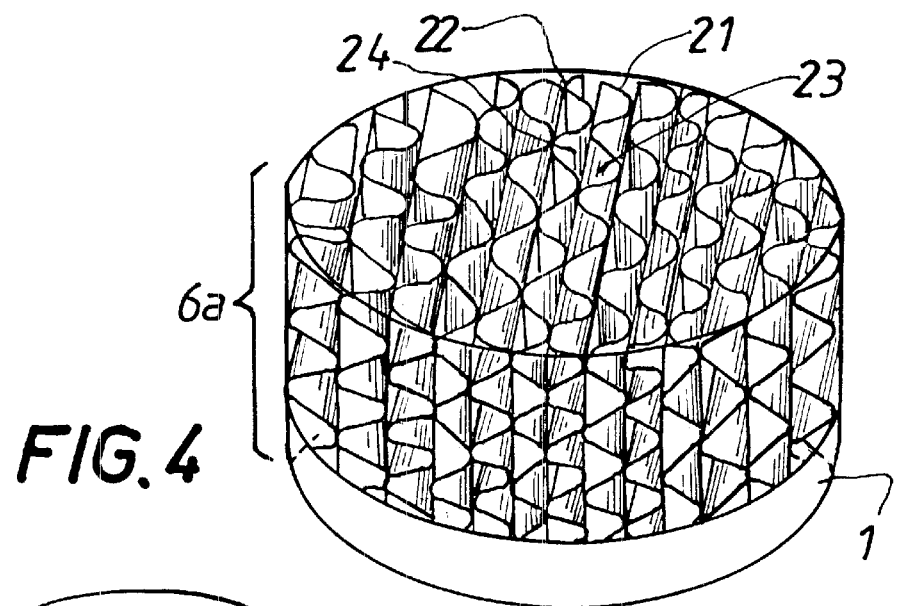
FIGS. 4 and 5 are cut-away perspective views of two packing elements of the static mixer type, that can be advantageously positioned upstream from the injection area of the charge to be cracked, or yet used as a means of re-homogenization of the reaction mixture downstream from the injection area of the charge.

FIG. 4 is a perspective view of an element of the static mixer type, that constitutes a preferred packing element for the device as set forth in the invention. This packing element 6a is attached in the reactor 1 upstream from the injection area of the charge to be cracked, not represented here. This element consists of an assembly of corrugated sheets, cut crosswise in relation to the general direction of the corrugations. Two consecutive sheets 21 and 22 are assembled in such a way that the corrugation ridge of the first creates an angle of more or less 90 degrees with the corrugation ridge of the second. Thus, the corrugation ridges of each sheet crisscross with the corrugation ridges of the adjacent sheet, and therefore form cells 23, 24 disposed in a network of intersected canals.

In the case that is presented, the corrugated sheets made of heat resistant steel are soldered to each other at the point of their corrugation ridges. The flow of gas and catalyst particles penetrates into the cells and is guided through the intersected canals. The network of cells makes it possible to divert the gas and the particles in a perceptibly radial manner, and this at each intersection that is created by the corrugation ridges of one sheet with the corrugation ridges of an adjacent sheet, resulting in a homogenous distribution of the catalytic particles within the gaseous fluid.

Figure 5:
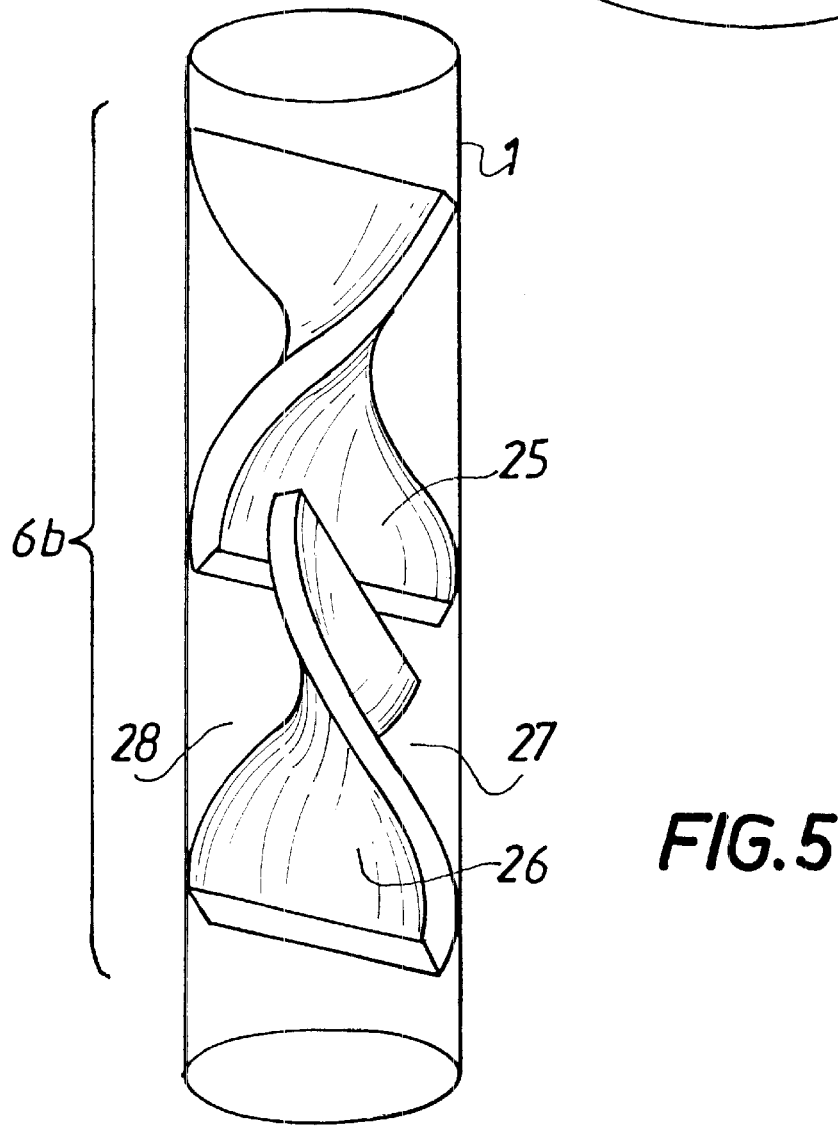

FIG. 5 is a perspective view of another type of static mixer, that can also constitute a packing element for the device as set forth in the invention. This packing element 6b is fastened in the reactor 1 upstream from the injection area of the charge to be cracked, not represented here.

It consists of two helix fragments 25, 26 side by side and staggered in rotation. The first helix fragment 26 divides the section of the reactor 1 into two twisted cells 27 and 28, that radially divert the flow of gas and particles that passes through them. The next helix fragment 25 re-divides and re-diverts said flow, which, in the end, results in a homogenization of the latter.

Here, two consecutive helix fragments are represented, but the packing element can show one single or advantageously several such fragments. Furthermore, on one same section of the reactor, the packing may contain one single helix fragment that takes up all or part of said section, or, on the contrary, several parallel helix fragments.

Figure 6:
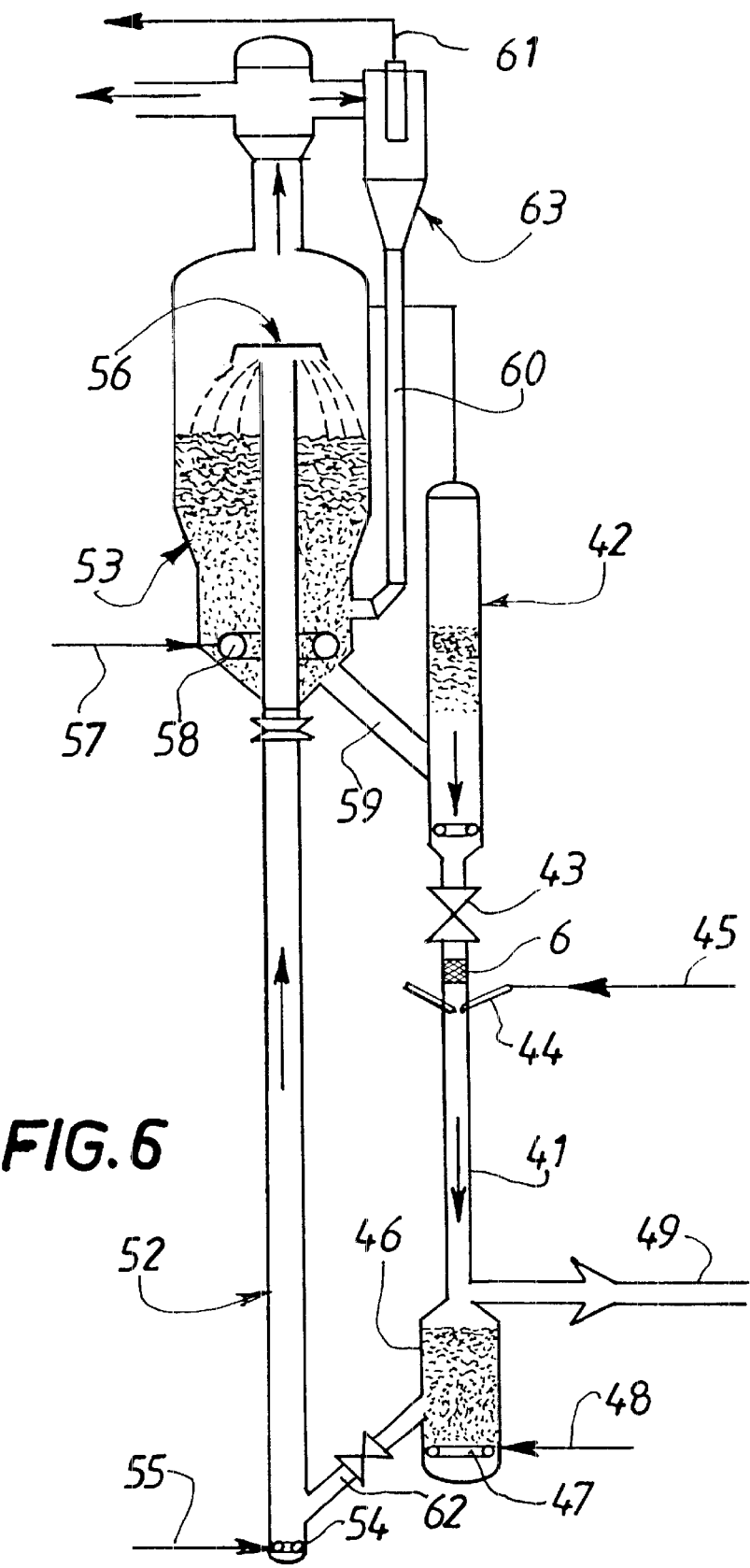
FIG. 6 is a cut-away view that illustrates the use of a device as set forth in the invention in the case of a catalytic cracking device equipped with a reactor whose flow is essentially downward.

FIG. 6 illustrates the application of the invention in the case of one catalytic cracking unit equipped with a reactor whose flow is essentially downward.

The device represented contains a tubular reactor 41 with a downward flow, or "downer", fed in its upper part, from a chamber 42, which is concentric to it, with regenerated catalyst particles, with a rate that is adjusted using a valve 43. Under this valve, the feeding of the reactor 41 with a flow of catalyst particles takes place using a device that is consistent with the invention: a packing element 6 consisting of a network of cells, for example an element of the static mixer type such as those represented in FIG. 4, ensures a series of divisions and recombinations of the flow of particles and gas that passes through it, ensuring a homogenization and a stabilization of said flow immediately upstream from the injection area of the charge to be cracked, located at the level of the injectors 44. This charge is transported to the injectors-pulverizers 44 via line 45. The catalyst particles and the hydrocarbons then flow from top to bottom in the reactor 41.

At the base of the latter, the spent catalyst particles pour out into a stripping chamber 46, equipped at its base with a diffuser 47, fed in water vapor via line 48.

Also at the base of the reactor 41, above the chamber 46, a line 49 comes out, through which the products of the cracking and the hydrocarbons emanating from the stripping are discharged toward an area where they will be fractionated.

The particles of the stripped catalyst are discharged by gravity out of the chamber 46 via a slanted pipe 62, toward an upward column 52, in which they are transported toward the top, toward a regenerator 53 using a carrier gas diffused in 54 at the base of column 52 from line 55.

Column 52 comes out in the regenerator 53 below a ballistic separator 56, which ensures the separation of the catalyst particles and the carrier gas. The catalyst particles are then regenerated by combustion of the coke that has deposited on their surface, using an air or oxygen current conveyed via line 57 to the diffuser 58.

In the upper part of the regenerator 53, the gases emanating from the combustion are discharged toward the cyclones 63. The catalyst particles that are carried off are recycled by the pipe 60 toward the regenerator, and the gases are discharged via line 61. As to the particles of the regenerated catalyst, they are discharged, at the base of the regenerator 53, by gravity along pipe 59 in the direction of the chamber 42.

The purpose of the following example is to illustrate the invention and therefore is not intended as limitative.

EXAMPLE

Three tests of catalytic cracking were carried out using a heavy oil charge, consisting of a distillate under vacuum, to which was added a cut rich in aromatic extracts that are particularly resistant to cracking. This charge has a density at 15° C. of 0.94 and a molecular hydrogen content of 11.8% by weight.

The tests were carried out in an experimental catalytic cracking unit that contained a reactor of the "riser" type (such as that represented in FIG. 1). The catalyst used is a conventional commercial catalyst of the zeolitic type.

The first test is carried out in accordance with the prior art. In particular, the reactor does not contain any homogenization device of the flow of gas and catalyst between the level of introduction of said flow in the reactor and the level of injection of the charge to be cracked.

For the second test, the unit is modified in accordance with the invention: the packing elements whose configuration is that of a static mixer such as that represented in FIG. 4, are fastened in the reactor, between the feeding area in catalyst flow and the injection area of the charge to be cracked.

The third test is also carried out in a unit that is in accordance with the invention, but that has been further perfected in comparison to that of the second test: the reactor further contains, immediately downstream from the injection area of the charge to be cracked, a series of profiled annular obstacles with a rounded section. The configuration of the mixing chamber so obtained is as represented in FIG. 2.

For these three tests, the charge is injected at a rate of 6,600 tons per day and the reactor operates at an output temperature of 505° C.

The following Table lists a certain number of operational conditions and summarizes the results of the three tests in terms of conversion and temperature yields prevailing in the reactor immediately downstream from the injection area of the charge. These temperatures were measured at two levels (at 2 meters and at 3 meters above the level of injection of the charge), each time using a system of four thermocouples evenly spaced on the internal wall of the reactor.

TABLE

|  | Test No 1 | Test No 2 | Test No 3 |
|---|---|---|---|
| Operational Conditions |  |  |  |
| Preheating temperature of the charge (° C.) | 380 | 371 | 368 |
| Temperature of the regenerator (° C.) | 737 | 703 | 693 |
| C/O ratio | 3.6 | 4.3 | 4.6 |
| Coke Delta | 0.98 | 0.82 | 0.77 |
| Yields: |  |  |  |
| Conversion (% by weight) | 53.4 | 59.6 | 61 |
| Yield in gas (% by weight) | 2.98 | 2.53 | 2.17 |
| Yield in LPG (% by weight) | 9.13 | 10.52 | 11.01 |
| Yield in gasoline (% by weight) | 36.28 | 41.38 | 42.65 |
| Yield in distillate (% by weight) | 26.13 | 24.67 | 24.85 |
| Yield in slurry (% by weight) | 21.92 | 17.35 | 15.76 |
| Yield in coke (% by weight) | 3.55 | 3.55 | 3.55 |
| Temperatures downstream from the injection of the charge |  |  |  |
| At 2 m from the injection of the charge: |  |  |  |
| average (° C.) | 540 | 524 | 520 |
| dispersion (° C.) | ±15 | ±6 | ±2 |
| At 3 m from the injection of the charge: |  |  |  |
| average (° C.) | 525 | 520 | 518 |
| dispersion (° C.) | ±8 | ±5 | ±2 |
| Calculated mixing temperature (° C.) | 553 | 550 | 548 |

In the preceding table, the products obtained are defined as follows:

gas: light hydrocarbons with 1 or 2 carbon atoms and hydrogen sulphide ($H_2S$);

LPG: light hydrocarbons with 3 or 4 carbon atoms;

gasoline: cut of hydrocarbons whose boiling range extends from 20° C. up to around 200° C.;

distillate: cut of hydrocarbons whose boiling range extends from 200° C. up to around 360° C.;

slurry: distillation residue that contains significant quantities of catalyst dust and whose boiling range usually extends beyond 500° C.

Note that, during tests No. 2 and No. 3, no rapid variations of pressure were detected upstream from the injectors of the charge to be cracked, as was the case in test No 1. This indicates that the implementation of the invention makes it possible to eliminate the pulsating pattern, or to stabilize the feeding of the injection area of the charge in catalyst flow.

Furthermore, in tests No 2 and No 3, measures taken by gammametry no longer reveal a marked heterogeneity of the density of the fluidized bed of catalyst particles that penetrates the injection area of the charge to be cracked. Therefore, the implementation of the invention makes it possible to homogenize the flow of gas and catalyst in one same section of the reactor.

The table presented above clearly emphasizes the progress brought by this invention.

On the one hand, in tests No 2 and No 3, as set forth in the invention, we note a net reduction of the dispersion of the temperatures indicated by the thermocouples placed immediately downstream from the injection area of the charge. This indicates a good homogeneity of the profile of the temperatures prevailing in the reactor immediately downstream from the injection area of the charge. Furthermore, the level of temperatures observed is lower, and inferior to the calculated mixture temperature. All these results indicate, for tests No 2 and No 3, when compared to test No 1 in accordance with the prior art, a net improvement of the homogeneity, velocity and efficiency of the contact between the charge to cracked and the flow of catalyst, as well as a better progression of the reaction (endothermic process).

This improved contact between the flow of catalyst and the injected charge is translated by a reduction of the rate of coking of the catalyst, illustrated by the Coke Delta parameter (or coke mass that deposits during the cracking process per unit of catalyst mass). This reduction of the Coke Delta observed in tests No 2 and No 3 makes it possible, at a constant output temperature of the reactor, to lower the temperature of the regenerator and to increase the speed of circulation of the catalyst (or increase the C/O ratio). We then have favorable conditions for a better selectivity of the catalytic cracking reactions.

On the other hand, the homogenization and the stabilization of the flow of catalyst that feeds the reactor using a packing of the static mixer type has made it possible to increase the conversion by more than 6 points, as shown in test No 2. Adding a re-mixing system immediately downstream from the injection of the charge made it possible to yet further improve the invention and bring an additional conversion gain of 1.5 points.

Also, the invention makes it possible to effectively increase the selectivity of the cracking reactions: for tests No 2 and No 3, we note a net reduction in the yields in light gases and slurry, which are the undesirable products since they are not very amenable to beneficiation. This reduction takes place in favor of the sought intermediate products, such as gasoline and LPG.

Lastly, we note that the light gasoline obtained in tests No 2 and No 3 is of a much better quality than that obtained in test No 1: indeed it contains much less olefins (which are undesirable components). This indicates that the invention allows for a net reduction of the undesirable thermal cracking reactions, in favor of the sought catalytic cracking reactions, since they are more selective and generate better quality products.

Therefore, the device and the method as set forth in the invention make it possible to greatly improve the yields of the catalytic cracking units, which is all the more noticeable when we wish to treat charges that are particularly resistant to cracking, as is the case in the example given above.

What is claimed is:

1. A fluid state catalytic cracking reactor comprising an essentially tubular, vertical chamber in which a charge to be cracked is placed in contact with a flow of catalyst particles that move following a flow that is essentially upward, said vertical chamber comprising in its lower portion a catalyst supply area for supplying catalyst particles that are at least partially regenerated, an injection area for injecting the charge to be cracked, at least one solid fastened static mixer packing element, located between the catalyst supply area and the injection area of the charge to be cracked, that extends over all or part of the cross section of the reactor and comprises a network of cells through which pass the catalyst particles, wherein said network ensures at least one division and recombination of the flow of catalyst particles, so as to redistribute the particles in a homogenous manner over the cross section of the reactor, and wherein said network of cells deviates in a radial manner the direction of the flow of gas and particles that passes through it by directing about 50% of the flow of gas and particles in a first direction and directing about 50% of the flow of gas and particles in a second direction, wherein the second direction has an angle of 10 to 90 degrees from the first direction, and an elevator gas injection area located upstream of the catalyst supply area, for introducing an elevator gas.

2. The reactor as set forth in claim 1, wherein said network of cells comprises an assembly of corrugated sheets, cut crosswise in relation to the general direction of their corrugations, and molded or soldered so that the corrugation ridge of each sheet creates an angle of about 45 to 135 degrees with the corrugation ridge of the adjacent sheet.

3. The reactor as set forth in claim 1, wherein the reactor contains at least two packing elements.

4. The reactor as set forth in claim 1, wherein said at least one packing comprises a material able to resist heat and erosion.

5. The reactor as set forth in claim 1, wherein said at least one packing element is positioned, in vertical portion of the reactor located upstream from the injection of the charge, at a level such that the flow of catalyst grains that passes through the at least one packing element is in the form of a fluidized phase whose density, by injection of fluidization vapor, can be adjusted to a value ranging between 200 and 800 $kg/m_3$.

6. The reactor as set forth in claim 2, wherein the corrugation ridge of each sheet creates an angle of about 90 degrees with the corrugation ridge of the adjacent sheet.

7. The reactor as set forth in claim 3, wherein the reactor contains from two to four packing elements.

8. The reactor as set forth in claim 4, wherein said material is selected from the group consisting of heat resistant steel and ceramic.

9. The reactor as set forth in claim 3, wherein at least two packing elements have identical structures.

10. The reactor as set forth in claim 3, wherein at least two packing elements have different structures.

11. A method of catalytically and/or thermally cracking a hydrocarbon charge comprising:

forming a fluidized bed of catalyst particles in the fluid state catalytic cracking reactor of claim 1 and injecting a hydrocarbon charge into the fluid state catalytic cracking reactor through the injecting area for injecting the charge.

12. The method of catalytically and/or thermally cracking a hydrocarbon charge of claim 11, wherein said hydrocarbon charge is a heavy oil charge.

* * * * *